May 6, 1969   YVON MARIE-XAVIER BROISE ET AL   3,442,122
TESTING PROBE FOR SOILS
Filed Dec. 5, 1966
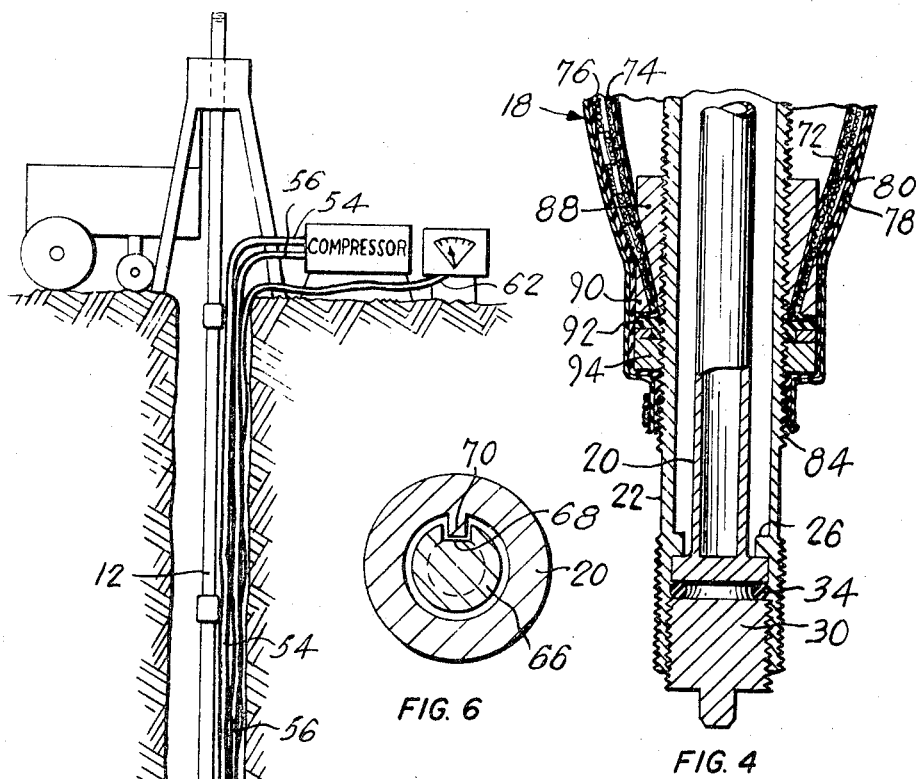
FIG. 4
FIG. 6
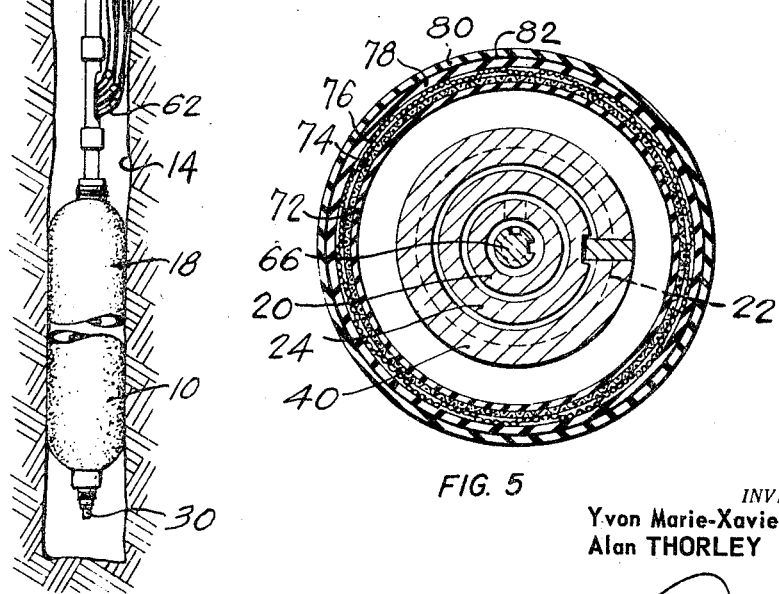
FIG. 1
FIG. 5
INVENTORS
Yvon Marie-Xavier BROISE
Alan THORLEY
ATTORNEY 3,442,122
TESTING PROBE FOR SOILS
Yvon Marie-Xavier Broise, 4197 Prince Charles Ave., Chomedey, Quebec, Canada, and Alan Thorley, 686 Lakeshore Drive, Dorval, Quebec, Canada
Filed Dec. 5, 1966, Ser. No. 599,021
Int. Cl. E21b 47/026
U.S. Cl. 73—151                                    6 Claims

ABSTRACT OF THE DISCLOSURE

The testing probe is of the type used for measuring the bearing capacities of soils and includes a tube which is insertable in a bore hole of given diameter. The tube is diametrically expandable under pressure to a diameter larger than the diameter of the hole and includes a measuring device having an electrical pulse generating device for measuring the diametric expansion of the tube under a given pressure. Thus, the resistance of the soil at that location can be determined.

---

The present invention relates to the science of soil mechanics, and more particularly to an apparatus for determining load deformation characteristics of earth, rock or man-made building materials such as concrete or the like.

Heretofore, probes of this nature consisted of hollow rubber cylinders which could be placed in bore holes. Fluid pressure was applied interiorly and measurements were recorded from the surface, based on volumetric changes in the rubber cylinder. These types of probes have proven unsatisfactory in most cases since sharp protuberances on the substance being tested tend to puncture the cylinder and in a substance of low resistance the cylinder tends to "balloon" at its center section, making the reading obtained virtually indeterminable to an operator watching the recording instruments. Furthermore, since the bore hole must be diametrically larger than the probe, the rubber which is elastic tends to expand longitudinally as well as laterally between the probe core and the wall of the bore hole, thereby erroneously affecting the recording instruments.

The construction of the present invention includes a probe comprising an enclosed flexible cylindrical member made of an inelastic material, a fluid tight elastic cylindrical membrane extending within said flexible cylindrical member, means for applying internal fluid pressure to said cylindrical members thereby affecting dimensional variations to said cylinder, and measurement means proportionally sensitive to dimensional changes in said flexible cylindrical member.

Having thus described the nature of the invention, particular reference will be made to the accompanying drawing showing by way of illustration a preferred embodiment thereof, and in which:

FIGURE 1 is a schematic diagram representing the various elements of the probe apparatus in operation;

FIGURE 4 is a fragmentary enlarged view of a detail shown in FIGURE 2;

FIGURE 5 is a lateral cross section taken along lines 5—5 of FIGURE 2; and

FIGURE 6 is an enlarged fragmentary cross section taken along lines 6—6 of FIGURE 2.

Figure 2:
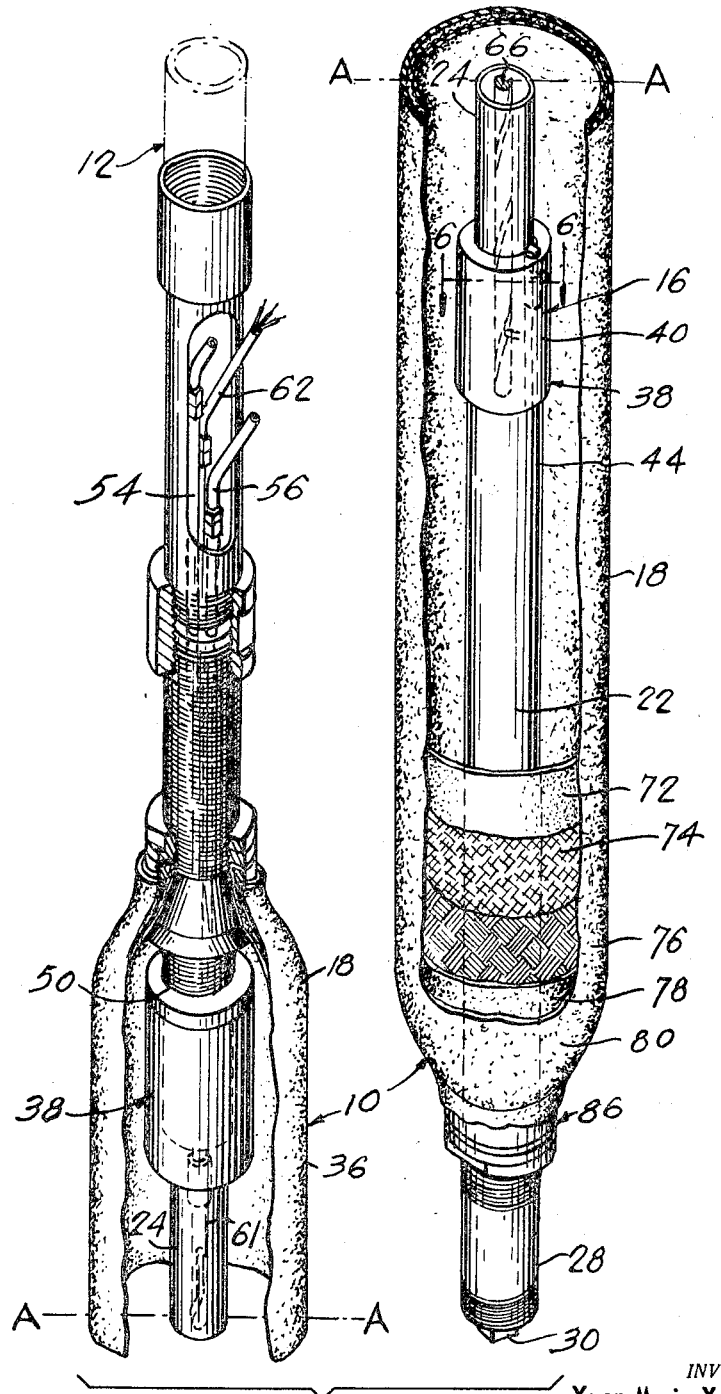
FIGURE 2 is a perspective, partly cut-away view of the probe.
Figure 3:
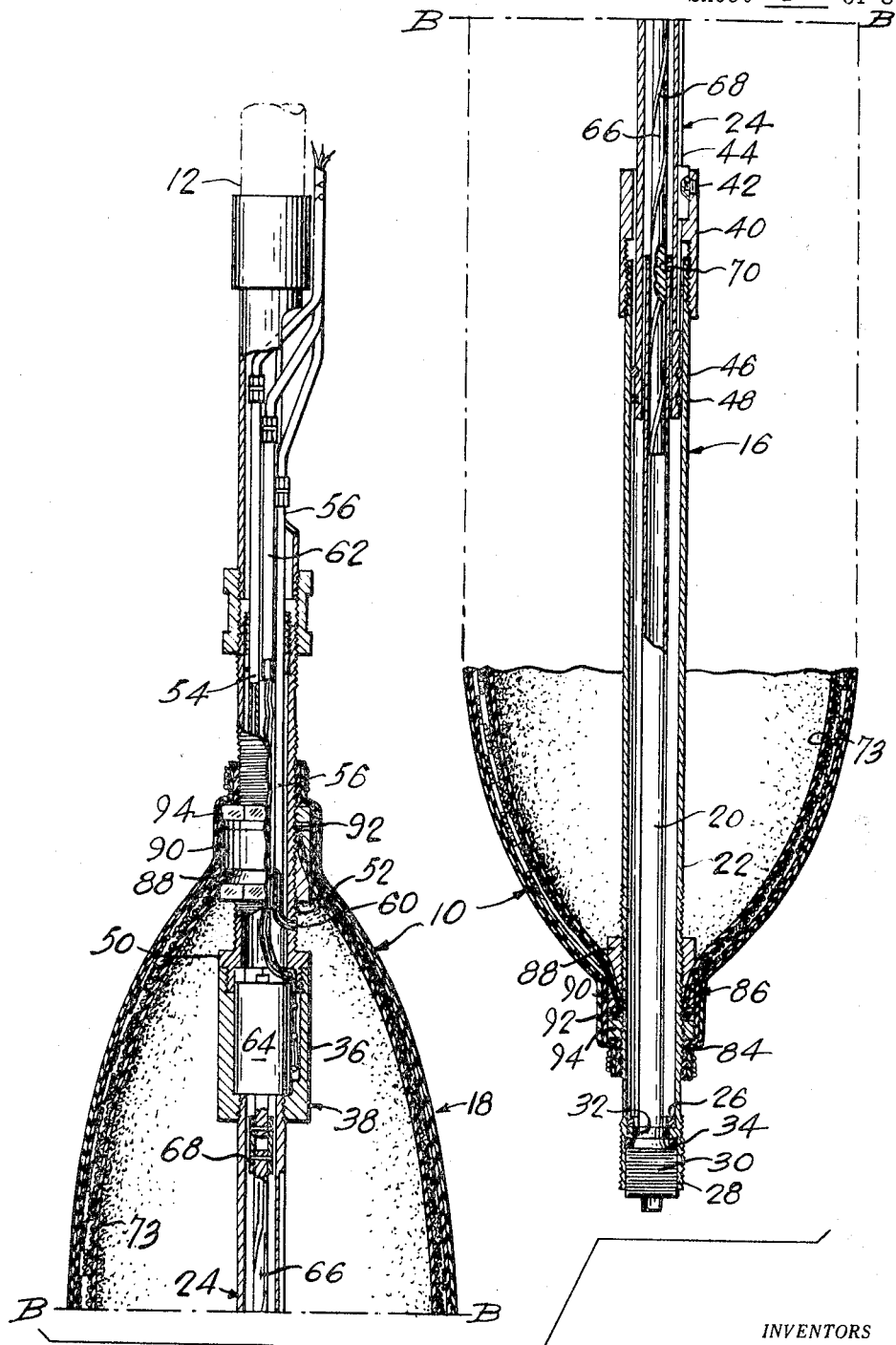
FIGURE 3 is a longitudinal cross section taken along the axis of the probe.

Referring now to the drawings and more specifically to FIGURES 1 and 2, the probe 10 is shown suspended by coupled drill rods 12 in a bore hole 14. The probe 10 is made up of a telescopic core section 16, an inflatable flexible sleeve 18 concentric with both ends of the telescopic core section 16 connected at axially spaced-apart portions of the telescopic core section 16.

The telescopic core section 16 includes three tubes 20, 22 and 24, each of different diameters. Tubes 20 and 22 are mounted together concentrically and tube 24 is adapted to slide telescopically between tubes 20 and 22. Tube 22 includes an integral annular shoulder 26 on its interior surface, spaced a short distance from the tube end 28. The interior surface of the tube 22 is threaded between shoulder 26 and the tube end 28 to receive a threaded plug 30. Tube 20 is diametrically small enough to extend through the aperture formed by annular shoulder 26. Tube 20 includes a flange 32 at one end thereof which abuts the shoulder 26. When tube 20 is in this position, an O-ring 34 is pressed on the opposite side of the flange 32, by the threadably engaged plug 30. A recess 33 is also provided in the closed end of tube 20 whereby a resetting tool can engage the tube 20 when plug 30 is removed to rotate it to a desired setting.

Tube 24 is threadably secured at one end to the casing 36 of the potentiometer 38. The free end of tube 24 is adapted to slide concentrically between tubes 20 and 22. An adapter 40 is threadably engaged to the exterior surface of tube 22 and includes an inwardly extending protuberance 42 which is adapted to slide in the straight guideway 44 provided axially in the outer surface of the tube 24. O-rings 46 and 48 are also provided near the end of tube 24 to sealingly engage the inner surface of the tube 22. The potentiometer casing 36 is cylindrical in shape and includes a threaded cap 50 having a hollow tubular neck 52 extending axially in a direction opposite the tube 24. The fluid lines 54 and 56 are mounted inside the hollow neck 52 whereby line 54 communicates with the interior of casing 36 and tube 24. Line 56 communicates with port 60 provided in the side of neck 52. A third line 62 is also provided in the neck 52 which carries the electric leads from the potentiometer 38.

The rotor 64 of the potentiometer 38 is directly connected with a shaft 66 by means of a coupling 68. The shaft 66 extends axially and concentrically through the tube 24 and partly within the smaller tube 20. Shaft 66 includes a spiral guideway 68 provided along most of its length. A protuberance 70 on the inside of tube 20 is adapted to engage the guideway 68 of shaft 66.

The flexible sleeve 18 includes an inner sleeve of expandable material such as rubber sleeve 72, sealingly defining chamber 73, a plastic (such as Dacron) mesh sleeve 74, fitted about the rubber sleeve 72; a steel mesh sleeve 76 about the plastic mesh sleeve 74; a first outer rubber sleeve 78 about the steel mesh sleeve 76; and a second rubber sleeve 80 extending about the first outer isomeric sleeve 78 with a lubricant 82 such as talc generously provided between the two outer rubber sleeves 78 and 80. The sleeves 72, 74 and 76 are of the same axial length and they are secured in sealing engagement at one end to the neck 52 and at the other end to the tube 22.

Sleeve 76 is shown as being in the form of a mesh, but it has also been contemplated to use a sleeve of weftless steel wires.

Since both ends are secured in a similar fashion only the end connected to the tube 22 will be described. The outer surface of tube 22 is threaded at 84 to receive wedge assembly 86. The wedge assembly 86 includes a threaded annular wedge ring 88 and a pressure ring 90. The ends of sleeves 72, 74 and 76 are secured in the wedge assembly 86 between the pressure ring 90 and the threaded wedge-shaped ring 88. A friction washer 92 is also provided with a threaded ring 94 so that the pressure on the pressure ring 90 can be adjusted. When it is required to replace any one of the sleeves 72, 74 and 76, the threaded ring 94 is simply retracted to remove the pressure, and the pressure ring 90 and friction washer 92 are simply slipped back. Rubber sleeves 78 and 80 can be merely taped to the outside of this connection.

The potentiometer leads passing through the line 62 are connected on the surface to a meter device from which movements of the potentiometer rotor 64 can be read and interpreted. The fluid lines 54 and 56 are alternatively attached to a compressor as shown in FIG. 1.

When it is required to test the soil by determining the resistance of the bore hole wall through pressure, the probe 10, in a deflated state as shown in dotted lines in FIGURE 1, is lowered into the bore hole by a conventional drilling apparatus. Fluid such as $CO_2$ from a compressor is first pumped into the chamber 73 formed by the flexible sleeve 18 through the fluid line 54 and the port 60. The $CO_2$ forces the flexible sleeve 18 to expand diametrically.

Because of the inelasticity of the flexible steel mesh sleeves 76, any increase in the diameter of the chamber 73 will result in a corresponding decrease in the length of the telescopic core section 16. As the core section 16 decreases, the tube 24 and the shaft 66 are forced to slide within the tubes 22 and 20 respectively. Since the tube 20 is fixed, and will not rotate about the axis of the probe, the protuberance 70, which slides in the spiral guideway 68, forces the shaft 66 to rotate. Such rotation of the shaft 66 directly rotates the rotor 64 causing an electrical impulse to be transmitted to the meter device on the surface.

If there is a leak in the seal formed by O rings 46 and 48 the fluid escaping will simply be bled through line 54.

Conversely, if it is required to deflate the chamber 73 in order to remove the probe from the bore hole, the $CO_2$ pressure will be taken off line 54 and $CO_2$ will then be pumped through the line 56 through the tubes 24 and 22. This air pressure build-up in the telescopic core section 16 will force the core section 16 to extend itself by moving the tube 22 axially away from the tube 24. As the telescopic core section 16 is extended, the flexible sleeve 18 will extend longitudinally, thereby deflating itself diametrically. Fluid from chamber 73 is now exhausted through port 60 and bled to surface through line 54.

As is now obvious, the purpose of the various sleeves is as follows:

rubber sleeve 72 provides a sealed fluid chamber 73;
steel mesh sleeve 76 is the flexible sleeve which can be moved diametrically or longitudinally, but since it is completely inelastic, it will not balloon or have other disadvantages that a solely elastic sleeve would have;
rubber sleeve 78 protects the mesh sleeves 74 and 76 and also adds to the sealing capacity of the chamber;
rubber sleeve 80, which is the outermost sleeve, receives the most wear since it comes into contact with the bore hole walls and it is required to change this sleeve quite often.

A layer of talc or other lubricant 82 is provided to the two outermost sleeves 78 and 80 to lubricate the two outermost elastic sleeves which may normally stick together on account of the high coefficient of friction between the two sleeves.

In one example of the probe 10, the diameter of a fully deflated probe would be 1.6 inches.

|  | Inches |
|---|---|
| Total length deflated | 33 |
| Total length inflated | 24 |
| Diameter when fully inflated | 3.25 |

Preferably, $CO_2$ gas is used as the pressure fluid, but nitrogen or other compressible fluids or even incompressible fluids can be used.

The structure of the present invention could be used in other applications. For instance, if the measurement devices, such as the potentiometer 48, were removed, the remaining structure could conceivably be used as an expansion means for quarrying rock. For instance, devices of the type described can be lowered into a series of bore holes drilled substantially close together but tracing a proposed cut in the rock to be quarried. By inserting exceedingly high pressure in the device, the probe 10 would of course expand diametrically if enough pressure is applied, the devices would crack the rock along the series of bore holes, thus producing the desired cut.

We claim:
1. A probe, comprising an axially extending core section having a pair of hollow portions in telescopic arrangement, defining a closed chamber, a flexible sleeve concentric with said core section and having its end portions connected one to each telescoping portion; said flexible sleeve including an expandable inelastic sleeve, a fluid tight membrane of elastic material provided coextensive with and within said inelastic sleeve, said flexible sleeve defining a diametrically deformable chamber, a first fluid inlet means communicating with said chamber; a second fluid inlet means communicating with said hollow core section, sealing means fluid-sealing said hollow core section from said chamber, means providing fluid under pressure through said first inlet to said chamber to diametrically expand said chamber from a deflated position to a chamber inflated position whereby said core section is reduced longitudinally, and means providing fluid under pressure through said second inlet to said closed chamber defined by said core section when pressure has been released from said chamber forcing said telescopic core section to extend longitudinally, thereby reducing the chamber diametrically from said inflated position to said deflated position.

2. A probe, as defined in claim 1, wherein said flexible sleeve includes said expandable inelastic sleeve and said coextensive membrane, characterized in that said expandable sleeve is made from a braided steel tubular mesh, and said membrane is made of isomeric material.

3. A probe, as defined in claim 1, wherein said flexible sleeve includes an expandable inelastic sleeve of steel wire braided mesh, a second coextensive inelastic sleeve of plastic braided mesh, said elastic membrane being of isomeric material, and at least one outer elastic membrane of isomeric material co-extensive with said inelastic sleeves for protecting the inelastic sleeves.

4. A probe, as defined in claim 1, wherein means are provided for measuring the longitudinal extent through which the core section telescopes from said deflated position to said inflated position.

5. A probe, as defined in claim 1, wherein the axially extending core section includes a pair of tubular hollow portions, a first tubular hollow portion including a smaller coaxial tube member fixed to a free end of said first tubular portion; the second tubular portion being of sufficient size to slide coaxially between said first tubular portion and said smaller coaxial tube member; said second tubular portion including means for measuring the axial extent through which the second tubular portion slides in between the first tubular portion, and the smaller coaxial tube member, at the chamber, moves between a deflated position and an inflated position.

6. A probe, as defined in claim 5, wherein the measurement means is in the form of a potentiometer fixed to said second tubular member, a coaxial rotatable shaft extending from the rotor of said potentiometer into said smaller coaxial tubular member, means provided in said smaller tubular member adapted to rotate said shaft as it slides therein while the chamber expands from a deflated position to an inflated position whereby said potentiometer transmits an electrical impulse, to a meter means, proportional to the revolutions of said shaft.

References Cited

UNITED STATES PATENTS

| 2,643,722 | 6/1953 | Lynes et al. | 166—187 X |
|---|---|---|---|
| 2,828,823 | 4/1958 | Mounce | 166—187 |
| 2,957,341 | 10/1960 | Menard | 73—84 |
| 3,283,823 | 11/1966 | Warrington | 166—187 |
| 3,364,737 | 1/1968 | Comes | 73—151 |

RICHARD C. QUEISSER, *Primary Examiner.*

J. W. MYRACLE, *Assistant Examiner.*

U.S. Cl. X.R.

73—84